(12) United States Patent
Yogesh et al.

(10) Patent No.: US 12,464,233 B2
(45) Date of Patent: Nov. 4, 2025

(54) APPARATUS FOR AUTOMATIC LENS FOCUSING IN A CAMERA FOR ONE OR MORE IMAGES

(71) Applicant: E-CON SYSTEMS INDIA PRIVATE LIMITED, Chennai (IN)

(72) Inventors: S Yogesh, Chennai (IN); Bharanidharan Jayaraman, Chennai (IN)

(73) Assignee: E-CON SYSTEMS INDIA PRIVATE LIMITED (IN)

( * ) Notice: Subject to any disclaimer, the term of this patent is extended or adjusted under 35 U.S.C. 154(b) by 80 days.

(21) Appl. No.: 18/429,530

(22) Filed: Feb. 1, 2024

(65) Prior Publication Data

US 2025/0254423 A1 Aug. 7, 2025

(51) Int. Cl.
*H04N 23/67* (2023.01)
*H04N 23/54* (2023.01)
*H04N 23/55* (2023.01)

(52) U.S. Cl.
CPC ............. *H04N 23/67* (2023.01); *H04N 23/54* (2023.01); *H04N 23/55* (2023.01)

(58) Field of Classification Search
CPC ......... H04N 23/67; H04N 23/54; H04N 23/55
USPC ........................................................ 348/349
See application file for complete search history.

(56) References Cited

U.S. PATENT DOCUMENTS

| | | |
|---|---|---|
| 11,070,709 B2 | 7/2021 | Lee et al. |
| 2013/0163095 A1* | 6/2013 | Wu ............... H04N 25/615 359/698 |
| 2015/0341542 A1* | 11/2015 | Preston ............ H04N 23/635 348/346 |
| 2021/0080675 A1 | 3/2021 | Bae |
| 2022/0116522 A1 | 4/2022 | Sharma |

FOREIGN PATENT DOCUMENTS

WO 2001044850 A2 6/2001

* cited by examiner

*Primary Examiner* — Joel W Fosselman
(74) *Attorney, Agent, or Firm* — Jason C. Cameron

(57) ABSTRACT

An apparatus for automatic lens focusing in a camera for one or more images is provided. An apparatus includes a platform to receive a lens holder mounted on an image sensor. The lens holder includes the lens to form images of a target object on the image sensor. The apparatus includes a lens adjusting unit including fixed rollers and a driver roller. The fixed rollers and the driver roller are to establish a contact with the lens. The driver roller is to rotate to turn the lens to adjust parameters of the images. The apparatus includes a control unit to compute a modulation transfer function value based on the images of the target object received from the image sensor. The control unit is to compare the modulation transfer function value with a predefined threshold to generate driving signals to rotate the driver roller.

19 Claims, 2 Drawing Sheets

APPARATUS FOR AUTOMATIC LENS FOCUSING IN A CAMERA FOR ONE OR MORE IMAGES

FIELD OF INVENTION

Embodiments of the present disclosure relate to a field of optical elements and more particularly to an apparatus for automatic lens focusing in a camera for one or more images.

BACKGROUND

A camera is a device which captures images. The camera directs light to fall on an image sensor through a lens to capture the images. Based on focusing capabilities, the camera may be classified as a fixed focus camera and a variable focus camera. The fixed focus camera includes the lens positioned at a specific focal distance to focus an entire scene at a specific range. The variable focus camera includes the lens, which allows the user to change the focal length of the lens, thereby adjusting the focus of the camera.

Conventionally, the lens of the fixed-focus camera is positioned at the specific focal distance from the image sensor manually. Manual positioning of the lens introduces a significant time overhead, thereby diminishing overall productivity during manufacturing phase of the fixed-focus camera. Also, the manual positioning of the lens may not be an optimal and efficient method for achieving the desired focus, potentially leading to suboptimal results in terms of image quality and precision.

Hence, there is a need for an improved apparatus for automatic lens focusing in a camera for one or more images to address the aforementioned issue(s).

BRIEF DESCRIPTION

In accordance with an embodiment of the present disclosure, an apparatus for automatic lens focusing in a camera for one or more images is provided. An apparatus includes a platform. The platform is adapted to receive a lens holder mounted on an image sensor. The lens holder includes a first plurality of threads to house the lens adapted to form the one or more images of a target object on the image sensor. The platform is also adapted to move the lens holder and the image sensor in a predefined direction upon receiving the lens holder. The apparatus also includes a lens adjusting unit positioned adjacent to the platform. The lens adjusting unit includes a plurality of fixed rollers and a driver roller mounted on a corresponding flange. The plurality of fixed rollers and the driver roller are adapted to establish a contact with the lens when the lens holder attains a coplanar position with respect to the plurality of fixed rollers and the driver roller. The driver roller is adapted to rotate to turn the lens to adjust one or more parameters of the one or more images by modifying a distance between the lens and the image sensor. The apparatus also includes a control unit operatively coupled to the driver roller through an actuator. The control unit is configured to compute a modulation transfer function value based on the one or more images of the target object received from the image sensor. The control unit is also configured to compare the modulation transfer function value with a predefined threshold to generate one or more driving signals. The control unit is further configured to provide the one or more driving signals to the actuator to rotate the driver roller, thereby performing automatic lens focusing in the camera for the one or more images.

To further clarify the advantages and features of the present disclosure, a more explicit description of the disclosure will follow by reference to specific embodiments thereof, which are illustrated in the appended figures. It is to be appreciated that these figures depict typical embodiments of the disclosure and are therefore not to be considered limiting in scope. The disclosure will be described and explained with additional details with the appended figures.

BRIEF DESCRIPTION OF THE DRAWINGS

The disclosure will be described and explained with additional specificity and detail with the accompanying figures in which.

Figure 1:
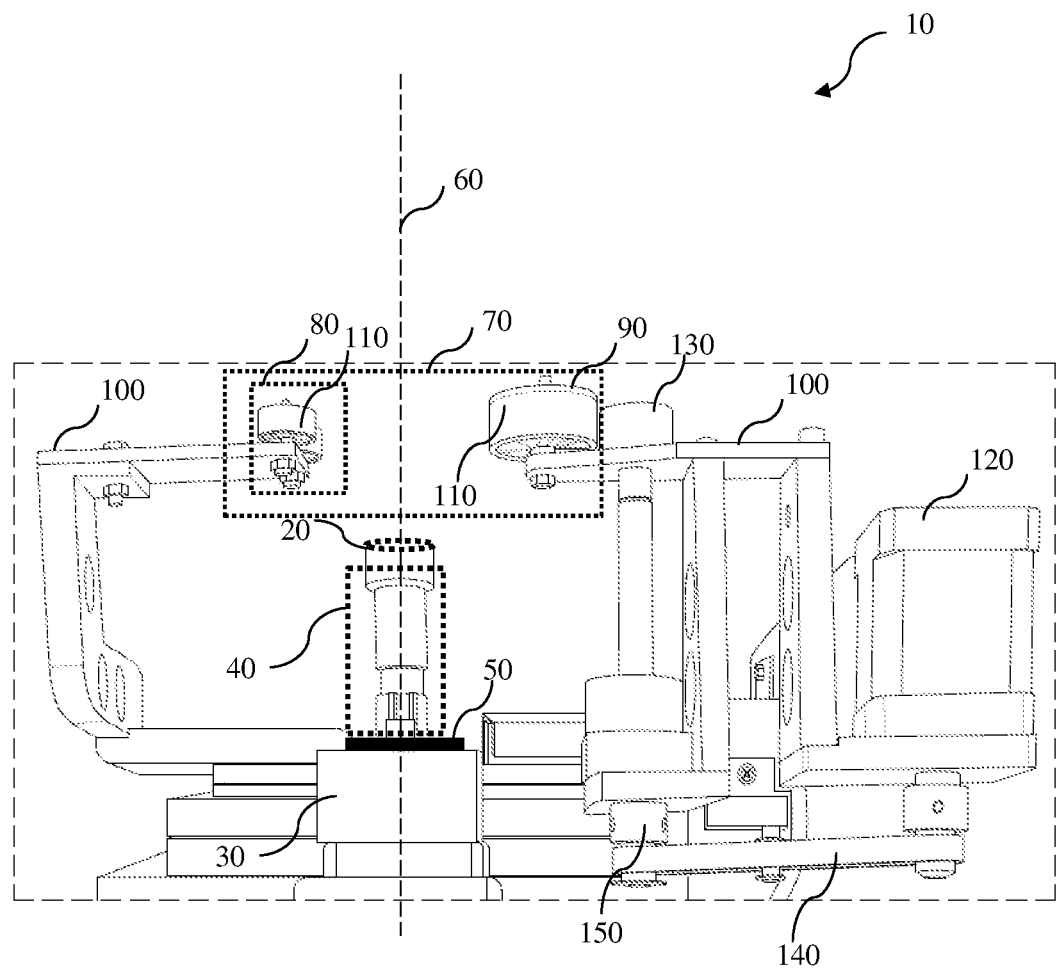
FIG. 1 is a schematic representation of an apparatus for automatic lens focusing in a camera for one or more images in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

To promote an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises' 'a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to an apparatus for automatic lens focusing in a camera for one or more images. An apparatus includes a platform. The platform is adapted to receive a lens holder mounted on an image sensor. The lens holder includes a first plurality of threads to house the lens adapted to form the one or more images of a target object on the image sensor. The platform is also adapted to move the lens holder and the image sensor in a predefined direction upon receiving the lens holder. The apparatus also includes a lens adjusting unit positioned adjacent to the platform. The lens adjusting unit includes a plurality of fixed rollers and a driver roller mounted on a corresponding flange. The plurality of fixed rollers and the driver roller are adapted to establish a contact with the lens when the lens holder attains a coplanar position with respect to the plurality of fixed rollers and the driver roller. The driver roller is adapted to rotate to turn the lens to adjust one or more parameters of the one or more images by modifying a distance between the lens and the image sensor. The apparatus also includes a control unit operatively coupled to the driver roller through an actuator. The control unit is configured to compute a modulation transfer function value based on the one or more images of the target object received from the image sensor. The control unit is also configured to compare the modulation transfer function value with a predefined threshold to generate one or more driving signals. The control unit is further configured to provide the one or more driving signals to the actuator to rotate the driver roller, thereby performing automatic lens focusing in the camera for the one or more images.

FIG. 1 is a schematic representation of an apparatus 10 for automatic lens focusing in a camera for one or more images in accordance with an embodiment of the present disclosure. An apparatus 10 includes a platform 30. The platform 30 is adapted to receive a lens holder 40 mounted on an image sensor 50. In one embodiment, the lens holder 40 may be composed of a material comprising plastic and metal. The lens holder 40 includes a first plurality of threads (not shown in FIG. 1) to house the lens 20 adapted to form the one or more images of a target object on the image sensor 50. In some embodiments, the lens 20 may include a second plurality of threads (not shown in FIG. 1) located on an outer periphery of the lens 20. In such an embodiment, the second plurality of threads may be adapted to mate with the first plurality of threads to house the lens 20 in the lens holder 40. In some embodiments, the lens 20 may include a camera lens.

Further, in one embodiment, the lens 20 may include a convex lens. In some embodiments, the lens 20 may include a concave lens. In a specific embodiment, the lens 20 may include a combination of the convex and the concave lens including a light filter. The platform 30 is also adapted to move the lens holder 40 and the image sensor 50 in a predefined direction upon receiving the lens holder 40. In such an embodiment, the predefined direction may include at least one of an upward direction along a vertical axis 60 of the platform 30, and a downward direction along the vertical axis 60 of the platform 30. The apparatus 10 also includes a lens adjusting unit 70 positioned adjacent to the platform 30. The lens adjusting unit 70 includes a plurality of fixed rollers 80 and a driver roller 90 mounted on a corresponding flange 100.

Furthermore, in one embodiment, the corresponding flange 100 may be adapted to undergo one or more relative movements with respect to the lens holder 40. In such an embodiment, the one or more relative movements may include a movement towards the lens holder 40, and the movement away from the lens holder 40. In some embodiments, the plurality of fixed rollers 80 and the driver roller 90 may include a corresponding bearing wrapped in a bushing material 110 to provide positive gripping between the lens holder 40 and each of the plurality of fixed rollers 80 and the driver roller 90. In such an embodiment, the bushing material 110 may include synthetic rubber, natural rubber, any non-metal material.

Moreover, the plurality of fixed rollers 80 and the driver roller 90 are adapted to establish a contact with the lens 40 when the lens holder 40 attains a coplanar position with respect to the plurality of fixed rollers 80 and the driver roller 90. The driver roller 90 is adapted to rotate to turn the lens 40 to adjust one or more parameters of the one or more images by modifying a distance between the lens 20 and the image sensor 50. In one embodiment, the lens holder 40 may be adapted to undergo at least one of a telescopic extension and a telescopic retraction upon turned by the driver roller 90. In some embodiments, the driver roller 90 may be adapted to rotate in at least one of a clockwise direction and an anti-clockwise direction. In such an embodiment, the lens holder 40 may be adapted to turn out of phase with respect to the rotation of the driver roller 90. In a specific embodiment, the one or more parameters may include sharpness, depth of field, contrast, bokeh, resolution, and image composition.

Additionally, the apparatus 10 includes a control unit (not shown in FIG. 1) operatively coupled to the driver roller 90 through an actuator 120. In some embodiments, the driver roller 90 may be rotated by rotating an auxiliary roller 130 coupled to the actuator 120 through a belt 140 and a gear reduction assembly 150. In one embodiment, the control unit may include at least one of a computer, a micro controller, and a microprocessor. The control unit is configured to compute a modulation transfer function value based on the one or more images of the target object received from the image sensor 50. In one embodiment, the control unit may be adapted to receive the one or more images of the target object from the image sensor 50 through a wired network. In one embodiment, the wired network may include a universal serial bus cable. In some embodiments, the control unit may be adapted to receive the one or more images of the target object from the image sensor 50 through a wireless network. In one embodiment, the wireless network may include wireless fidelity, bluetooth, infrared, long range radio signals and the like.

Also, the control unit is configured to compare the modulation transfer function value with a predefined threshold to generate one or more driving signals. The control unit is further configured to provide the one or more driving signals to the actuator 120 to rotate the driver roller 90, thereby performing automatic lens focusing in the camera for the one or more images. In one embodiment, control unit may be adapted to provide the one or more driving signals to the actuator 120 through a programmable logical controller (not shown in FIG. 1). In some embodiments, the actuator 120 may include at least one of a stepper motor, and a servo motor. In a specific embodiment, the control unit may be configured to set the predefined threshold from a file stored in memory based on a user input. In such an embodiment, the file may include an extensible markup language.

Further, in one embodiment, the apparatus 10 may include a pressure sensor (not shown in FIG. 1) connected to the driver roller 90. In such an embodiment, the pressure sensor may be adapted to assess wear and tear of the driver roller 90, the plurality of fixed rollers 80 based on a back pressure exerted by the lens holder 40 on the driver roller 90. In some embodiments, the apparatus 10 may include a collimator (not shown in FIG. 1) positioned adjacent to the lens 20. In such an embodiment, the collimator may be adapted to project one or more light rays to the lens 20 to simulate a predefined effect including the target object is being positioned at a predefined distance from the lens 20. In a specific embodiment, the apparatus 10 may include a proximity sensor (not shown in FIG. 1) mounted on at least one of plurality of fixed rollers 80 and the driver roller 90. In such an embodiment, the proximity sensor may be adapted to control movement of the lens holder 40 to align the lens holder 40 coplanar with the plurality of fixed rollers 80 and the driver roller 90.

Figure 2:
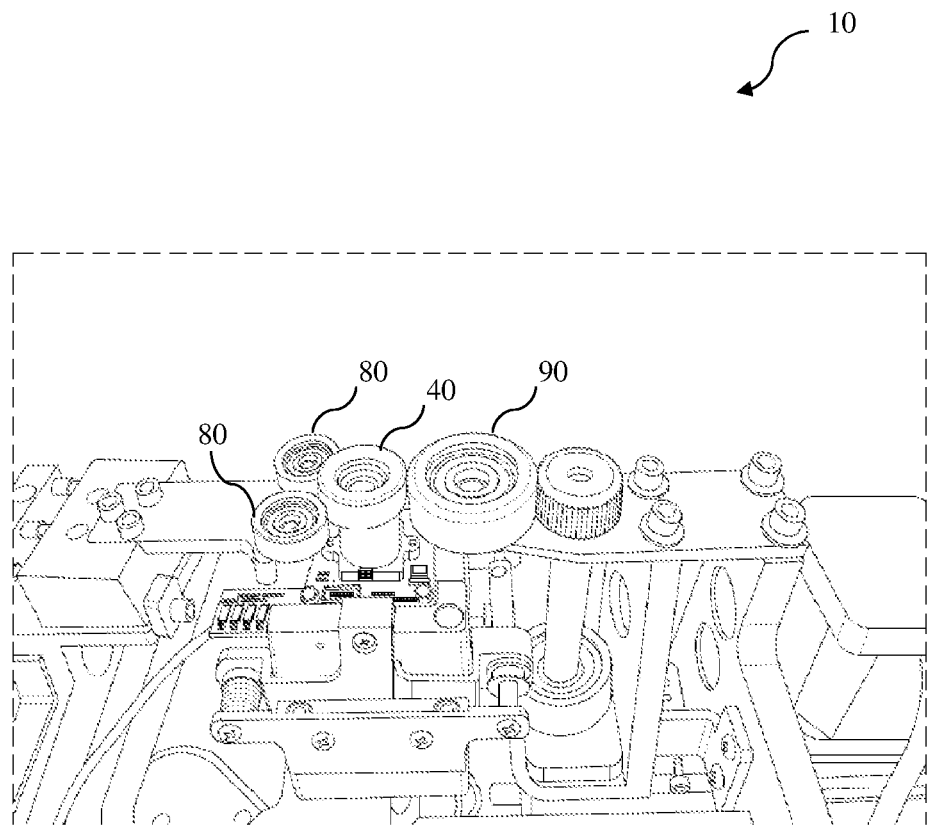
FIG. 2 is a schematic representation of another embodiment of the apparatus of FIG. 1, depicting operational arrangement of a plurality of fixed rollers, a driver roller and a lens holder when the lens holder attains a coplanar position with respect to the plurality of fixed rollers and the driver roller in accordance with an embodiment of the present disclosure.

FIG. 2 is a schematic representation of another embodiment of the apparatus 10 of FIG. 1, depicting operational arrangement of the plurality of fixed rollers 80, the driver roller 90 and the lens holder 40 when the lens holder 40 attains the coplanar position with respect to the plurality of fixed rollers 80 and the driver roller 90 in accordance with an embodiment of the present disclosure. Detailed working of the plurality of fixed rollers 80, the driver roller 90 and the lens holder 40 are provided along with FIG. 1 description.

Various embodiments of the apparatus for automatic lens focusing in the camera for the one or more images described above enable various advantages. The platform is capable of receiving the lens holder and positioning the lens holder in the coplanar position with respect to the plurality of fixed rollers and the driver roller, thereby enabling the plurality of fixed rollers and the driver roller to grip the lens holder. The driver roller is capable of rotating the lens holder based on the rotation of the actuator to modify the distance between the lens and the image sensor, thereby adjusting the one or more parameters of the one or more images to achieve optimum focus of the lens. Also, the control unit is capable of providing one or more driving signals to the actuator upon comparing the modulation transfer function value with the predefined threshold, thereby performing efficient focusing of the lens, within the minimum possible time, thereby increasing productivity.

Further, the first plurality of threads provided in the lens holder and the second plurality of threads provided on the lens are adapted to mate with each other, thereby enabling hassle free mounting of the lens in the lens holder. The capability of the lens holder to undergo at least one of the telescopic extension and the telescopic retraction upon turned by the driver roller, ensures accurate positioning of the lens with respect to the image sensor. Capability of the corresponding flanges to move toward the lens holder provides a way to grip the lens holder by the driver roller and the plurality of fixed rollers. Also, the driver roller is capable of rotating bidirectionally, resulting in at least one of the extension of the lens holder and the retraction of the lens holder, thereby assisting the accurate positioning of the lens from the image sensor.

Furthermore, the control unit is capable of receiving the one or more images from the image senor through wired as well as the wireless network, thereby ensuring flexibility in communication. Provision of the stepper motor as the actuator provides a way to accurately control the turning of the lens holder with required torque, thereby ensuring accurate adjustment of the lens with respect to the image sensor. Also, the control unit is capable of reading the threshold from the file stored in the memory based on the user input, thereby making the apparatus capable of calibrating various types of lenses.

Additionally, the pressure sensor connected to the driver roller is capable of assessing the wear and tear of the driver roller, the plurality of fixed rollers based on the back pressure exerted by the lens holder on the driver roller, thereby supporting predictive maintenance of the apparatus. Also, the collimator is capable of simulating position of the target object at the predefined distance from the lens, thereby providing the flexibility to calibrate the lens based on the target object placed at the predefined distance. The proximity sensor mounted on at least one of plurality of fixed rollers and the driver roller is capable of controlling the movement of the lens holder to align the same coplanar with the plurality of fixed rollers and the driver roller, thereby assisting the accurate calibration of the lens.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and is not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

We claim:

1. An apparatus for automatic lens focusing in a camera for one or more images comprising:
    a platform is adapted to:
        receive a lens holder mounted on an image sensor, wherein the lens holder comprises a first plurality of threads to house the lens adapted to form the one or more images of a target object on the image sensor;
        move the lens holder and the image sensor in a predefined direction upon receiving the lens holder;
    a lens adjusting unit positioned adjacent to the platform, wherein the lens adjusting unit comprises:
        a plurality of fixed rollers and a driver roller mounted on a corresponding flange, wherein the plurality of fixed rollers and the driver roller are adapted to establish a contact with the lens when the lens holder attains a coplanar position with respect to the plurality of fixed rollers and the driver roller,
        wherein the driver roller is adapted to rotate to turn the lens to adjust one or more parameters of the one or more images by modifying a distance between the lens and the image sensor,
        wherein the corresponding flange is adapted to undergo one or more relative movements with respect to the lens holder, wherein the one or more relative movements comprises a movement towards the lens holder, and the movement away from the lens holder;

a control unit operatively coupled to the driver roller through an actuator, wherein the control unit is configured to:

compute a modulation transfer function value based on the one or more images of the target object received from the image sensor;

compare the modulation transfer function value with a predefined threshold to generate one or more driving signals; and provide the one or more driving signals to the actuator to rotate the driver roller, thereby performing automatic lens focusing in the camera for the one or more images.

2. The apparatus of claim 1, wherein the lens comprises a convex lens.

3. The apparatus of claim 1, wherein the lens comprises a concave lens.

4. The apparatus of claim 1, wherein the lens comprises a combination of a convex lens and a concave lens.

5. The apparatus of claim 1, wherein the lens comprises a second plurality of threads located on an outer periphery of the lens, wherein the second plurality of threads are adapted to mate with the first plurality of threads to house the lens in the lens holder.

6. The apparatus of claim 1, the lens holder is adapted to undergo at least one of a telescopic extension and a telescopic retraction upon turned by the driver roller.

7. The apparatus of claim 1, wherein the plurality of fixed rollers and the driver roller comprises a corresponding bearing wrapped in a bushing material to provide positive gripping between the lens holder and each of the plurality of fixed rollers and the driver roller.

8. The apparatus of claim 1, wherein the driver roller is adapted to rotate in at least one of a clockwise direction and an anti-clockwise direction.

9. The apparatus of claim 1, wherein the lens holder is adapted to turn out of phase with respect to the rotation of the driver roller.

10. The apparatus of claim 1, wherein the one or more parameters comprises sharpness, depth of field, contrast, bokeh, resolution, and image composition.

11. The apparatus of claim 1, wherein the control unit comprises at least one of a computer, a micro controller, and a microprocessor.

12. The apparatus of claim 1, wherein the control unit is adapted to receive the one or more images of the target object from the image sensor through a wired network.

13. The apparatus of claim 1, wherein the control unit is adapted to receive the one or more images of the target object from the image sensor through a wireless network.

14. The apparatus of claim 1, wherein the control unit is adapted to provide the one or more driving signals to the actuator through a programmable logical controller.

15. The apparatus of claim 1, wherein the actuator comprises at least one of a stepper motor, and a servo motor.

16. The apparatus of claim 1, comprising a pressure sensor connected to the driver roller, wherein the pressure sensor is adapted to assess wear and tear of the driver roller, the plurality of fixed rollers based on a back pressure exerted by the lens holder on the driver roller.

17. The apparatus of claim 1, comprising a collimator positioned adjacent to the lens, wherein the collimator is adapted to project one or more light rays to the lens to simulate a predefined effect comprising the target object is positioned at a predefined distance from the lens.

18. The apparatus of claim 1, comprising a proximity sensor mounted on at least one of plurality of fixed rollers and the driver roller, wherein the proximity sensor is adapted to control movement of the lens holder to align the lens holder coplanar with the plurality of fixed rollers and the driver roller.

19. The apparatus of claim 1, wherein the control unit is configured to set the predefined threshold from a file stored in memory based on a user input, wherein the file comprises an extensible markup language.

* * * * *